(12) United States Patent
Kobayashi et al.

(10) Patent No.: US 10,487,897 B2
(45) Date of Patent: Nov. 26, 2019

(54) BRAKE DUST COVER

(71) Applicant: SUBARU CORPORATION, Tokyo (JP)

(72) Inventors: Ryuya Kobayashi, Tokyo (JP); Yuji Fujiu, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/722,042

(22) Filed: Oct. 2, 2017

(65) Prior Publication Data

US 2018/0094684 A1    Apr. 5, 2018

(30) Foreign Application Priority Data

Oct. 5, 2016 (JP) .................. 2016-197258

(51) Int. Cl.
*F16D 65/847* (2006.01)
*F16D 55/00* (2006.01)
*F16D 65/02* (2006.01)

(52) U.S. Cl.
CPC .... *F16D 65/847* (2013.01); *F16D 2055/0037* (2013.01); *F16D 2065/1328* (2013.01)

(58) Field of Classification Search
CPC ............. F16D 65/0081; F16D 65/847; F16D 2055/0037
See application file for complete search history.

(56) References Cited

U.S. PATENT DOCUMENTS 4,005,768 A  *  2/1977  Bubnash .......... B60T 1/065
                                                 188/218 A
4,253,552 A     3/1981  Shibatani et al.
(Continued)

FOREIGN PATENT DOCUMENTS

EP      3018379 A1    5/2016
JP    2002-276698 A   9/2002
(Continued)

OTHER PUBLICATIONS

Japanese Office Action dated Oct. 9, 2018, in corresponding Japanese Patent Application No. 2016-197258, with an English translation thereof.
(Continued)

*Primary Examiner* — Bradley T King
(74) *Attorney, Agent, or Firm* — McGinn I.P. Law Group, PLLC.

(57) ABSTRACT

A brake dust cover is installed in a brake system including a rotor disposed on an inner diameter side of a rim of a wheel and a caliper interposing and holding the rotor with brake pads and includes a main body, an extension, and an opening. The main body is disposed adjacent to the rotor on an inside of the rotor in a vehicle width direction, that is disposed so as to overlap at least a part of the rotor when viewed from an axle direction, and that is disposed such that an outer circumferential edge portion thereof is separated from an inner circumferential surface of the rim. The extension extends from a part of the outer circumferential edge portion of the main body to an outer diameter side. The opening is formed in the main body, and air in a wheelhouse is introduced toward the rotor through the opening.

13 Claims, 3 Drawing Sheets

(56) References Cited

U.S. PATENT DOCUMENTS

| | | | | |
|---|---|---|---|---|
| 4,313,528 A * | 2/1982 | Ito | ............................ | B60T 1/065 188/218 A |
| 4,317,508 A * | 3/1982 | Katagiri | .................. | F16D 55/22 188/218 A |
| 4,326,610 A * | 4/1982 | Mouza | .................... | F16D 53/00 188/218 A |
| 4,473,139 A | 9/1984 | Oka et al. | | |
| 4,973,103 A * | 11/1990 | Imajyo | .................. | B62D 25/02 296/191 |
| 5,727,895 A * | 3/1998 | Busse | ....................... | B60T 5/00 188/264 AA |
| 6,070,908 A * | 6/2000 | Skrzypchak | ............ | B60R 13/04 280/847 |
| 7,600,615 B2 * | 10/2009 | Ramsay | .................... | B60T 5/00 188/264 AA |
| 2005/0126868 A1 * | 6/2005 | Lee | ......................... | F16D 55/00 188/218 A |
| 2014/0262644 A1 * | 9/2014 | Browne | ................. | F16D 65/847 188/264 AA |
| 2016/0084328 A1 * | 3/2016 | Elliot | .................. | F16D 65/0025 188/218 A |
| 2016/0186822 A1 * | 6/2016 | Koshiyama | ......... | F16D 65/0081 301/6.8 |

FOREIGN PATENT DOCUMENTS

| | | |
|---|---|---|
| JP | 2009-179074 A | 8/2009 |
| JP | 2011-163484 A | 8/2011 |
| KR | 10-2005-0051263 A | 6/2005 |

OTHER PUBLICATIONS

Chinese Office Action dated Jul. 19, 2019, in corresponding Chinese Patent Application No. 201710927396, with a partial English translation.

* cited by examiner

BRAKE DUST COVER

CROSS REFERENCES TO RELATED APPLICATIONS

The present application claims priority from Japanese Patent Application No. 2016-197258 filed on Oct. 5, 2016, the entire contents of which are hereby incorporated by reference.

BACKGROUND

1. Technical Field

The present invention relates to a brake dust cover that is to be installed in a brake of an automobile, and in particular, to a brake dust cover that ensures cooling performance of the brake with a simple structure and that reduces an air resistance of the vehicle.

2. Related Art

An outboard disc brake including a rotor disposed on an inner diameter side of a rim of a wheel and a caliper that interposes and holds the rotor with pads is widely used as a service brake (brake used while a vehicle is traveling) of an automobile such as a car.

In such a disc brake, a plate-shaped brake dust cover is disposed adjacent to the rotor on the inside of the rotor in a vehicle width direction to protect, for instance, the rotor from foreign materials such as dust, a small stone, and muddy water.

A planar shape of the brake dust cover viewed from the vehicle width direction is typically a disc shape substantially concentric with the rotor or a sectorial shape with a notch to prevent interference with the caliper.

For instance, Japanese Unexamined Patent Application Publication No. 2002-276698, as a conventional technique related to rotor peripheral parts of a brake of an automobile, discloses that, in a drum-in-disc brake including a drum for a parking brake on the inner diameter side of the rotor of the disc brake, an outer circumferential edge portion of a disc-shaped splash guard disposed on the inside of the drum in the vehicle width direction is folded and inserted into a groove formed in the rotor to form a labyrinth seal structure so that muddy water, for instance, is prevented from entering the drum brake.

Japanese Unexamined Patent Application Publication No. 2009-179074 discloses that an air scoop through which air for cooling the brake during traveling is introduced is formed on the inner diameter side of the rotor so as to open on the front side of a vehicle.

Air flows from a lower portion of a vehicle body or an engine room to the inside of a wheelhouse in which a wheel is accommodated.

Air in the wheelhouse passes through the inner diameter side of a rim of the wheel, blows to the outside in the vehicle width direction, and interferes with air flowing along a side surface of the vehicle body, and this reduces an air resistance.

Regarding this, in the case where only an improvement in the air resistance is considered, it is only necessary for the air flowing from the wheelhouse to the inner diameter side of the rim to be blocked, for instance, by using a brake dust cover having an increased size. In this case, however, it is concerned that lack of cooling of the brake causes, for instance, fade or vapor lock.

In the case where the size of the brake dust cover is excessively increased, the weight of components is also increased.

SUMMARY OF THE INVENTION

In view of the above problems, it is desirable to provide a brake dust cover that ensures cooling performance of the brake with a simple structure and that reduces the air resistance of the vehicle.

An aspect of the present invention provides a brake dust cover that is to be installed in a brake system that includes a rotor disposed on an inner diameter side of a rim of a wheel and a caliper configured to interpose and hold the rotor with brake pads. The brake dust cover includes a main body that is disposed adjacent to the rotor on an inside of the rotor in a vehicle width direction, that is disposed so as to overlap at least a part of the rotor when viewed from an axle direction, and that is disposed such that an outer circumferential edge portion thereof is separated from an inner circumferential surface of the rim, an extension extending from a part of the outer circumferential edge portion of the main body to an outer diameter side, and an opening that is formed in the main body and through which air in a wheelhouse is introduced toward the rotor.

DETAILED DESCRIPTION

First Example

A brake dust cover according to a first example of the present invention will hereinafter be described.

The brake dust cover according to the first example is disposed in an outboard disc brake used as a service brake of an automobile such as a car.

Figure 1:
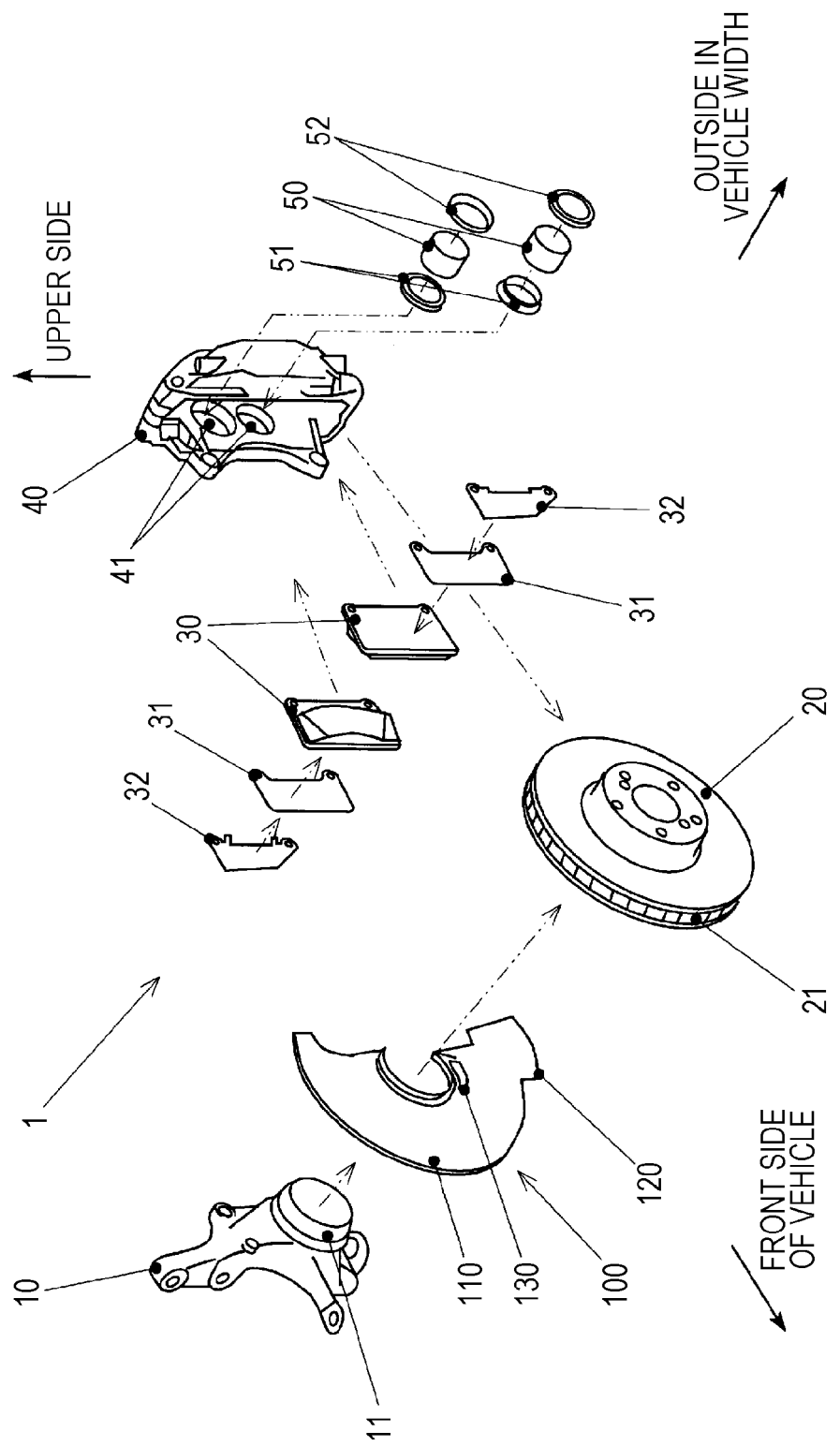
FIG. 1 is an exploded perspective view of components of a brake system including a brake dust cover according to a first example of the present invention.

FIG. 1 is an exploded perspective view of components of a brake system including the brake dust cover (referred to below as simply the "dust cover") according to the first example.

A brake system 1 is mounted on a housing 10 and includes a rotor 20, pads 30, a caliper 40, pistons 50, and a dust cover 100.

The housing 10 is a member that accommodates a hub bearing rotatably supporting a hub, not illustrated, to which a wheel (front wheel) is fastened.

A lower end portion of a strut of a MacPherson strut front suspension is fastened to an upper end portion of the housing 10.

A lower end portion of the housing 10 is coupled to a lower arm (transverse link) in a swingable manner with a ball joint interposed therebetween, and the lower arm is mounted on a vehicle body in a swingable manner.

A cylindrical member 11 is formed on the housing 10 so as to protrude to the outside in the vehicle width direction. The hub bearing is accommodated in the cylindrical member 11.

The cylindrical member 11 is substantially concentric with an axle.

The rotor 20 is a disc-shaped member that is secured to the hub and that rotates together with the wheel.

The rotor 20 is a ventilated disc in which an air channel 21 is formed at an intermediate portion in the width direction, and air for cooling passes through the air channel 21.

An air inlet and an air outlet of the air channel 21 are disposed at the center of the rotor 20 and at an outer circumferential edge portion of the rotor 20, respectively.

The air channel 21 is formed such that air in the inside is forcefully discharged to the outer diameter side by using a centrifugal force when the rotor 20 rotates and ambient air is inhaled from the inner diameter side.

The pads 30 are dampers disposed on both surface sides of the rotor 20.

The pads 30 create braking force by friction when coming into contact with the rotor 20 under pressure.

Pad shims 31 and 32 are disposed on back surface sides (sides opposite friction surfaces) of the pads 30.

The pad shims 31 and 32 are plate-shaped members disposed to reduce brake squeal and heat transfer from the pads 30 toward the pistons 50 during braking.

The caliper 40 is a member accommodating and holding the pads 30 with the rotor 20 inserted between the pads 30.

The caliper 40 is fastened to the housing 10.

Wheel cylinders 41 and a master cylinder, not illustrated, are formed in the caliper 40, and the pressure of brake fluid applied from a hydraulic control unit is transferred to the wheel cylinders 41.

For instance, the caliper 40 has a four-pods facing structure including two wheel cylinders per one surface of the rotor 20, four wheel cylinders in total.

The caliper 40 is disposed in a region nearer than the axle of the wheel to the rear side.

The pistons 50 are columnar members that are inserted in the wheel cylinders 41 of the caliper 40 and that press the pads 30 toward the rotor 20 by using the pressure of the brake fluid.

The pistons 50 include piston seals 51 and piston boots 52.

The piston seals 51 seal spaces between the outer circumferential surfaces of the pistons 50 and the inner circumferential surfaces of the wheel cylinders 41 to prevent the brake fluid from leaking.

The piston boots 52 are disposed on ends of the pistons 50 near the pads 30 and prevent, for instance, dust from entering the inside of the wheel cylinders 41.

The dust cover 100 is a member disposed adjacent to the surface of the rotor 20 on the inside in the vehicle width direction to prevent foreign material from attaching to, for instance, the rotor 20.

For instance, the dust cover 100 is formed in a plate shape in a manner in which a metallic thin plate is pressed. The dust cover 100 is fastened to the housing 10.

Figure 2:
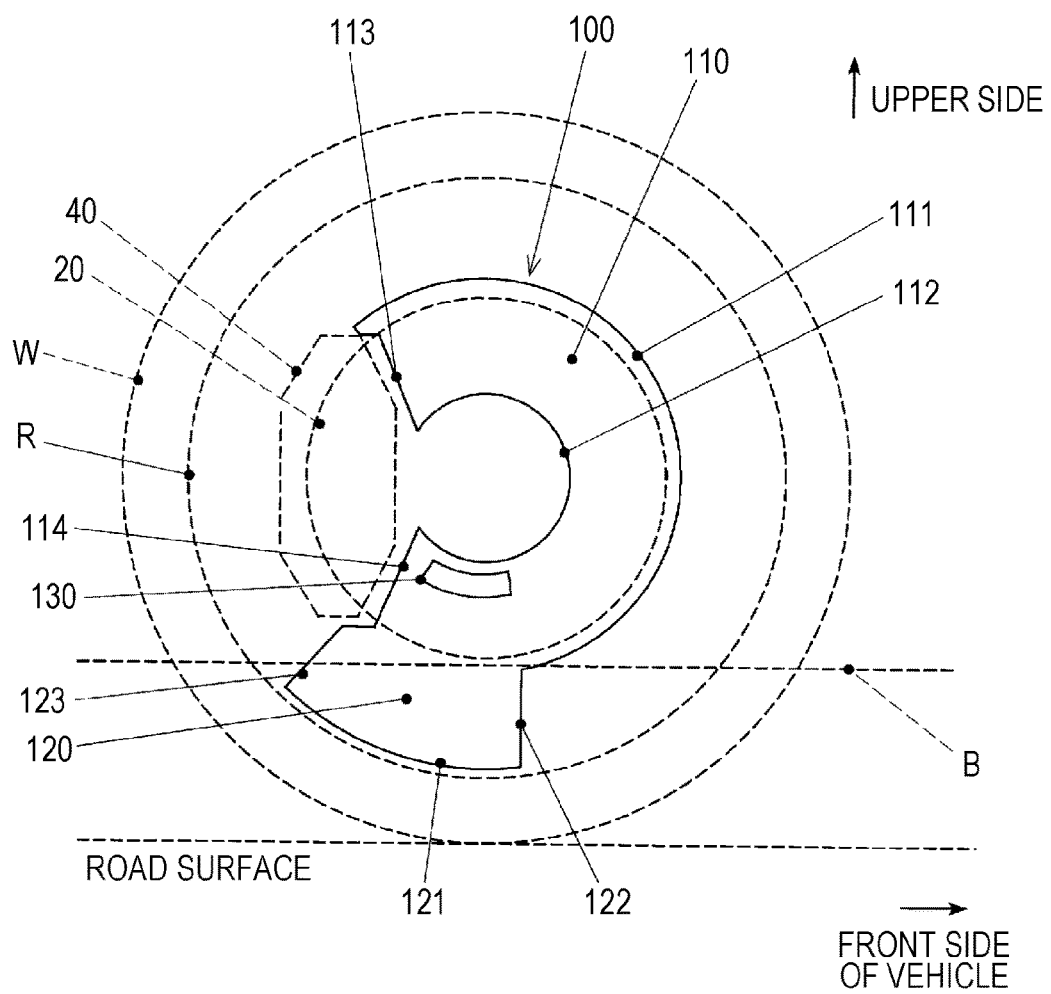
FIG. 2 is a schematic view of the brake dust cover according to the first example viewed from the inside in a vehicle width direction.

FIG. 2 is a schematic view of the brake dust cover according to the first example viewed from the inside in the vehicle width direction.

The dust cover 100 includes a main body 110, an extension 120, and an opening 130.

The main body 110 is formed in a substantially sectorial shape that is substantially concentric with the axle.

An outer circumferential edge portion 111 of the main body 110 is disposed approximately along the outer circumferential edge portion of the rotor 20 on the outer diameter side thereof.

The cylindrical member 11 of the housing 10 is inserted inside an inner circumferential edge portion 112 of the main body 110.

The main body 110 extends from the cylindrical member 11 toward the outer diameter side in the form of a flange.

End portions 113 and 114 of the main body 110 in the circumferential direction are disposed adjacent to an upper portion and a lower portion of the caliper 40, respectively.

A space between the end portions 113 and 114 serves as an escape for preventing interference with the caliper 40.

The extension 120 extends downward and rearward from a lower portion of the main body 110 toward the outer diameter side.

The extension 120 is formed in a sectorial shape substantially concentric with the axle such that an inner circumferential edge portion thereof is continuous with the outer circumferential edge portion of the main body 110.

A lower end portion (outer circumferential edge portion) 121 of the extension 120 is slightly spaced apart from the inner circumferential surface of a rim R of a wheel W.

The lower end portion 121 of the extension 120 is adjacent to the inner circumferential surface of the rim R and is formed in an arc shape substantially following the inner circumferential surface of the rim R.

The centroid (center of gravity) of a planar shape of the extension 120 when viewed from the vehicle width direction and the axle direction is located nearer than the axle to the rear side of a vehicle.

The lower end portion 121 is disposed below the lower surface of a vehicle body B.

With such a structure, the extension 120 prevents air flowing through a lower portion (under the floor) of the vehicle body B from entering the inner diameter side of the rim R.

A front edge portion 122 of the extension 120 is disposed slightly nearer than the axle to the front side in the front-rear direction of the vehicle.

A rear edge portion 123 of the extension 120 is disposed below the caliper 40.

The opening 130 is formed so as to extend through the main body 110 in the vehicle width direction and serves as an air channel through which air in the wheelhouse is introduced toward the rotor 20.

According to the first example, the opening 130 is disposed on the outer diameter side of the inner circumferential edge portion 112 of the main body 110, is adjacent to the inner circumferential edge portion 112, and is formed as an elongated hole extending approximately along an arc substantially concentric with the axle.

The opening 130 is disposed on the lower side when viewed from the axle.

The front edge and the rear edge of the opening 130 are located on the front side and the rear side with respect to the axle.

The opening 130 overlaps or is adjacent to the air inlet of the air channel 21 of the rotor 20 when viewed from the axle direction and the vehicle width direction.

According to the first example described above, the following effects are achieved. (1) Air is inhibited from blowing to the outside in the vehicle width direction via the inner diameter side of the rim R in a manner in which the extension 120 of the dust cover 100 is disposed in a region below the rim R, into which a large amount of air in the wheelhouse typically flows, to prevent the airflow, so that the air resistance of the vehicle can be reduced.

In addition, the cooling performance of the brake can be ensured in a manner in which the opening 130 is formed in the main body 110, which is a region other than the extension 120, to introduce air into the rotor 20. (2) A region nearer than the axle to the rear side, in which a relatively large amount of air is typically flows to the inner diameter side of the rim R, is blocked in a manner in which the centroid of the extension 120 is located nearer than the axle to the rear side when viewed from the vehicle width direction, so that the above effects can be achieved with certainty. (3) Air flowing through the lower surface side of the vehicle body B at a relatively high velocity and flow rate can be prevented from entering the inner diameter side of the rim R and blowing to the outside in the vehicle width direction in a manner in which the lower end portion 121 of the extension 120 is disposed below the lower surface of the vehicle body B. (4) Air that collides with the extension 120, that is prevented from entering the inner diameter side of the rim R, and that is left in the wheelhouse can be appropriately introduced toward the rotor 20 in a manner in which a part of the opening 130 is disposed in a region of the main body 110 nearer than the axle to the rear side. (5) Air is introduced into the air channel 21 of the rotor 20 with certainty in a manner in which the opening 130 in the form of an elongated hole concentric with the axle is disposed near the air inlet of the air channel 21 of the rotor 20, so that good cooling performance can be achieved.

Second Example

A brake dust cover according to a second example of the present invention will now be described.

In the following description according to the second example, components that are substantially shared with the first example are designated by like symbols, a description thereof is omitted, and points of difference will be described.

Figure 3:
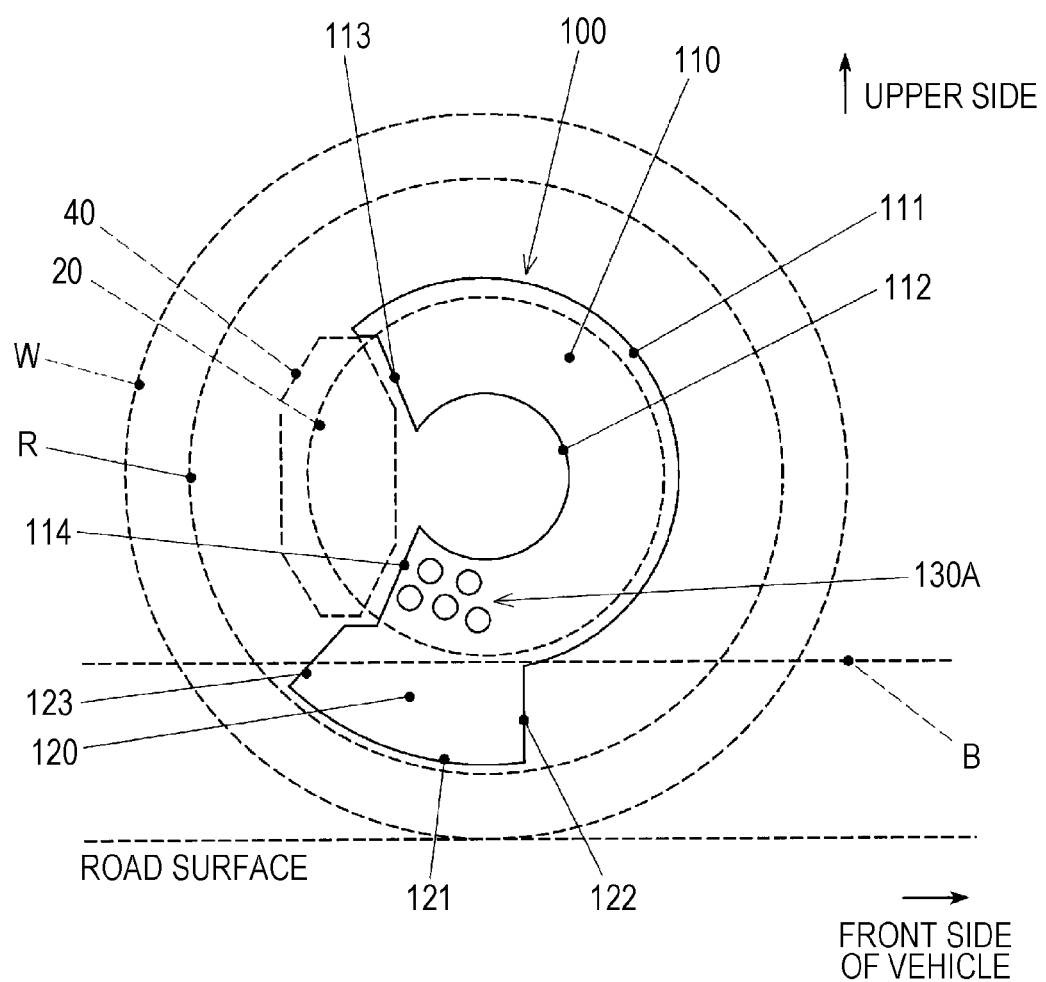
FIG. 3 is a diagram illustrating a brake dust cover according to a second example of the present invention viewed from the inside in the vehicle width direction.

FIG. 3 is a diagram illustrating the brake dust cover according to the second example of the present invention viewed from the inside in the vehicle width direction.

According to the second example, the dust cover 100 includes openings 130A described below instead of the opening 130 according to the first example.

The openings 130A, each of which is, for instance, circular, are disposed in a region of the main body 110 below the inner circumferential edge portion 112.

Such openings can be disposed selectively in a region on the rear side and on the lower side when viewed from the axle.

It is known that the pressure in the wheelhouse on the rear side of the wheel is typically higher than that on the front side. According to the first example, the extension 120 causes air that is prevented from entering the inner diameter side of the lower portion of the rim R to be left. For this reason, it is assumed that the pressure in such a region is particularly high.

In view of this, according to the second example, the openings 130A are disposed, and air having a relatively high pressure can be introduced toward the rotor 20, so that the rotor 20 can be effectively cooled.

When the arrangement of the openings 130A is determined, for instance, an experiment or a simulation can be conducted to investigate a region in which the pressure of air on the wheelhouse side is high, and the openings can be disposed in the region.

Also, according to the second example described above, the rotor 20 can be appropriately cooled while air in the wheelhouse is prevented from entering the inner diameter side of the rim.

Modification

The present invention is not limited to the examples described above, and various modifications and alterations can be made. These modifications and alterations are within the technical scope of the present invention.

The shape, structure, material, manufacturing method, arrangement, and number of components of the brake system and the brake dust cover are not limited to the above examples and can be appropriately changed.

For instance, the shape of the extension and main body of the brake dust cover, and the shape, number, and arrangement of the openings can be appropriately changed.

For instance, the brake dust cover may include both the opening according to the first example for introduction of air to the inner diameter side of the rotor and the openings according to the second example distributed in the main body.

According to the examples, the main body is formed in a sectorial shape to prevent the main body from interfering with the caliper. However, the main body may be formed in a substantially disc shape so as to cover a portion extending up to the caliper when viewed from the inside in the vehicle width direction.

The invention claimed is:

1. A brake dust cover installed in a vehicle equipped with a brake system that includes a rotor disposed on an inner diameter side of a rim of a wheel and a caliper configured to interpose and hold the rotor with brake pads, the brake dust cover comprising:
a main body disposed adjacent to the rotor so as to overlap at least a part of the rotor when viewed from an axle direction of the wheel in an installed state where the brake dust cover is installed in the vehicle, wherein the main body includes an outer circumferential edge portion that is separated from an inner circumferential surface of the rim in the installed state;
an extension extending from a part of the outer circumferential edge portion of the main body to an outer diameter side, wherein at least a part of the extension extends downward from the outer circumferential edge portion of the main body in the installed state, and wherein the extension includes a lower edge portion disposed adjacent to the inner circumferential surface of the rim in the installed state; and
an opening that is formed in the main body and through which air in a wheelhouse of the vehicle is introduced toward the rotor in the installed state,
wherein the extension and the main body are co-planar, and
wherein the extension extends radially downward from a circumferential edge of the main body such that a distal end of the extension is at a lower position in a radial direction than the circumferential edge of the main body.

2. The brake dust cover according to claim 1, wherein a centroid of the extension when viewed from the axle direction is located nearer than an axle to a rear side of the vehicle in the installed state.

3. The brake dust cover according to claim 1, wherein a lower end portion of the extension is disposed below a lower surface of a vehicle body of the vehicle near the wheel in the installed state.

4. The brake dust cover according to claim 1, wherein at least a part of the opening is disposed in a region of the main body nearer than an axle to a rear side of the vehicle in the installed state.

5. The brake dust cover according to claim 1,
wherein the rotor comprises a ventilated disc having an air channel extending from an air inlet disposed on an inner diameter side to an air outlet disposed on an outer diameter side, and
wherein at least a part of the opening is disposed adjacent to the air inlet when viewed from the axle direction in the installed state.

6. The brake dust cover according to claim 5,
wherein the opening adjacent to the air inlet is formed in an elongated hole extending approximately along an arc substantially concentric with an axle in the installed state.

7. The brake dust cover according to claim 1,
wherein the main body includes a region in which a pressure applied from the air in the wheelhouse is locally increased in the installed state, and
wherein at least a part of the opening is disposed so as to overlap the region when viewed from the axle direction in the installed state.

8. The brake dust cover according to claim 1,
wherein the rotor has a disc-shape that includes an outer circumference,
wherein the outer circumferential edge portion of the main body has an arc-shape disposed along the outer circumference of the rotor in the installed state, and
wherein the lower edge portion of the extension has an arc-shape disposed along the inner circumferential surface of the rim in the installed state.

9. The brake dust cover according to claim 1, wherein end portions of the main body in a circumferential direction are disposed adjacent to an upper portion and a lower portion of the caliper, respectively,
wherein a front edge portion of the extension is disposed nearer than an axle of the vehicle to a front side in a front-rear direction of the vehicle.

10. The brake dust cover according to claim 9, wherein a rear edge portion of the extension is disposed below the caliper, and
wherein the opening is disposed on the outer diameter side of an inner circumferential edge portion of the main body, is adjacent to the inner circumferential edge portion, and is formed as an elongated hole extending along an arc substantially concentric with the axle of the vehicle.

11. The brake dust cover according to claim 9, wherein the opening overlaps or is adjacent to an air inlet of the rotor when viewed from the axle direction and a vehicle width direction.

12. The brake dust cover according to claim 9, wherein a space between the end portions of the main body serves as an escape for preventing interference with the caliper.

13. A brake dust cover installed in a vehicle equipped with a brake system that includes a rotor disposed on an inner diameter side of a rim of a wheel and a caliper configured to interpose and hold the rotor with brake pads, the brake dust cover comprising:
a main body disposed adjacent to the rotor so as to overlap at least a part of the rotor when viewed from an axle direction of the wheel in an installed state where the brake dust cover is installed in the vehicle, wherein the main body includes an outer circumferential edge portion that is separated from an inner circumferential surface of the rim in the installed state;
an extension extending from a part of the outer circumferential edge portion of the main body to an outer diameter side, wherein at least a part of the extension extends downward from the outer circumferential edge portion of the main body in the installed state, and wherein the extension includes a lower edge portion disposed adjacent to the inner circumferential surface of the rim in the installed state; and
an opening that is formed in the main body and through which air in a wheelhouse of the vehicle is introduced toward the rotor in the installed state,
wherein the extension and the main body are co-planar.

\* \* \* \* \*